A. D. ROZEBOOM.
TIRE STRUCTURE.
APPLICATION FILED MAR. 25, 1920.
1,354,691. Patented Oct. 5, 1920.
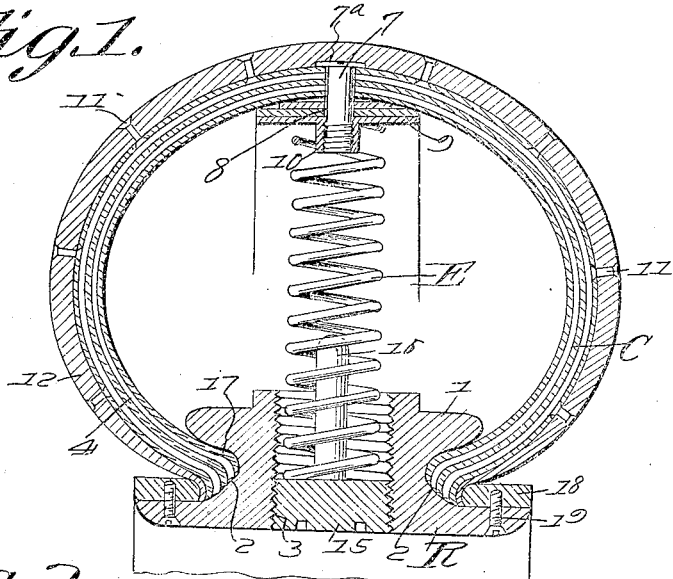
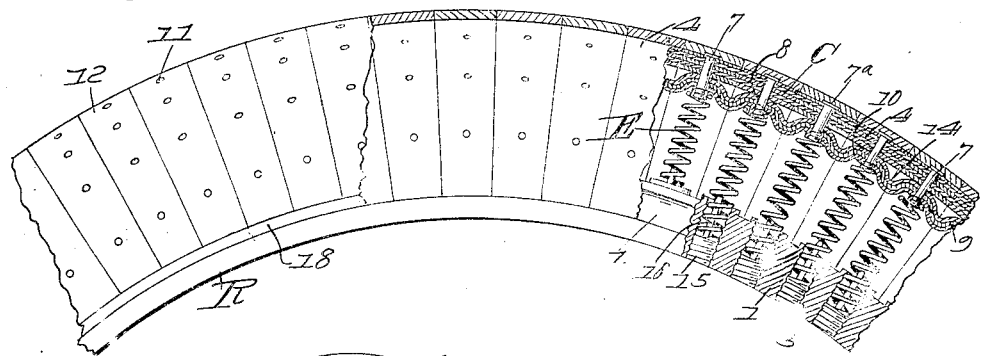
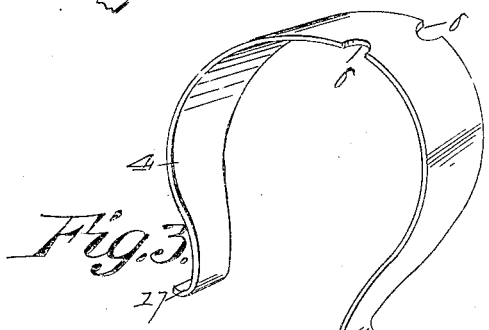
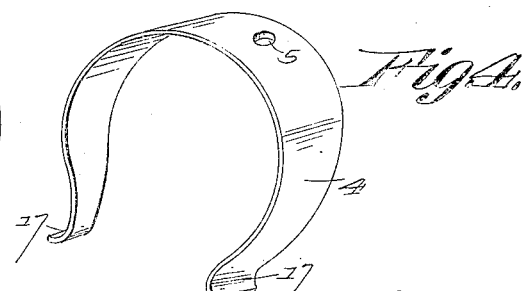
Inventor
A. D. Rozeboom,
By Watson E. Coleman
Attorney

UNITED STATES PATENT OFFICE.

ANDREW D. ROZEBOOM, OF BOWMAN, NORTH DAKOTA.

TIRE STRUCTURE.

1,354,691.   Specification of Letters Patent.   Patented Oct. 5, 1920.

Application filed March 25, 1920. Serial No. 368,598.

*To all whom it may concern:*

Be it known that I, ANDREW D. ROZEBOOM, a citizen of the United States, residing at Bowman, in the county of Bowman and State of North Dakota, have invented certain new and useful Improvements in Tire Structures, of which the following is a specification, reference being had to the accompanying drawings.

This invention relates to certain improvements in tire structures, and it is an object of the invention to provide a structure of this general character embodying novel and improved means whereby the use of air is eliminated and wherein the structure possesses substantially the same degree of resiliency as a pneumatic tire.

It is also an object of the invention to provide a novel and improved tire structure embodying a rim and a carcass connected one to the other and wherein the carcass proper comprises a construction possessing a certain degree of resiliency and wherein cushioning agency is interposed between the tread portion of the carcass and the rim.

The invention consists in the details of construction and in the combination and arrangement of the several parts of my improved tire structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a transverse sectional view taken through a tire structure arranged in accordance with an embodiment of my invention;

Fig. 2 is a fragmentary view partly in side elevation and partly in section of the structure as herein disclosed;

Fig. 3 is a view in perspective of one of the bands embodied in my improved structure; and Fig. 4 is a view in perspective of a second type of band embodied in my improved structure.

As disclosed in the accompanying drawings, R denotes a rim adapted to be mounted upon the felly of a wheel in any ordinary or preferred manner and said rim is provided at substantially its transverse center with the inwardly disposed and continuous bead or rib 1, having its opposite side faces provided with the continuous recesses or channels 2. Said rim, at predetermined points spaced circumferentially thereof, is provided therethrough with the threaded openings 3 which also extend through the rib or bead 1.

C denotes the carcass comprised in my improved structure and said carcass, as herein disclosed, comprises series of circumferentially related super-imposed metallic bands 4 of relatively narrow width and curved longitudinally in accordance with the conventional cross sectional configuration of a tire. In the present embodiment of my invention, the bands 4 of each series are five in number, although I do not wish to be understood as limiting myself in this respect as said bands may be of any number but preferably from five to nine dependent upon the load adapted to be imposed upon the structure. The bands 4 of adjacent series are in overlapping relation in order to preclude the passage of dirt or other foreign matter therebetween. In view of this overlapping relation of the bands 4 of adjacent series, alternate bands of each series at substantially the center thereof are provided with the openings 5 while the marginal portions of the interposed laminations are provided in their side edges with the notches or recesses 6, affording openings coinciding with the openings 5 in each series. Disposed through said openings of each series is a headed shank 7 having its head 7$^a$ overlying the outermost band, and said shank is also disposed through registering openings 8 provided in circumferentially disposed and superimposed annular members 9, possessing a certain degree of inherent resiliency. The inner end portion of the shank 7 is threaded withing a hollow or tubular boss 10 carried by the innermost annular member 9. By this means, each series of bands 4 has its tread portion effectively held in applied position. The annular members 9 in succession are of increased width with the narrower member disposed outermost. This is done in order that said superimposed annular members will offer no undue obstruction or hindrance to the series of bands 4.

Riveted, as at 11, to the outermost band 4 of each of said series is a lamination 12 of leather or other suitable material, said lamination being of substantially the same width as the outermost band and extending entirely therealong.

I also find it of advantage to have the annular members 9 between adjacent shanks 7 provided with the transversely disposed corrugations 14 and which corrugations permit a certain degree of expansion or contraction of the annular member 9 in a circumferential direction and whereby the requisite resiliency of the carcass is materially facilitated.

Threaded within the outer end portion of each of the openings 3 is a plug or member 15 provided at its axial center with an inwardly disposed finger or arm 16. Seated within the inner end portion of each of the openings 3 is an end portion of an expansible member E, herein disclosed as a coil spring, and which inserted end portion surrounds the finger or arm 16. The opposite end portion of the expansible member or spring E surrounds the boss 10 whereby said boss serves as a retaining means for said outer end portion of the member E. By adjusting the plug or member 15 longitudinally of the opening 3, the tension of the expansible member or spring E may be regulated or varied as may be required in practice.

Each of the members or springs E serves as a cushioning agency coacting with each series of imposed bands 4 and whereby the efficiency of the tire is materially facilitated.

The end portions of the bands 4 are flexed or outwardly curved, as at 17, to provide beads which snugly fit within the annular grooves or channels 2 in the side faces of the rib or bead 1. Said beads 17 are held in applied position within the grooves or channels 2 through the instrumentality of the removable rings 18 locked to the rim R by the removable screws 19, or the like.

From the foregoing description, it is thought to be obvious that a tire structure constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

I claim:—

1. A tire structure comprising, in combination, a rim provided therearound with grooves in its side faces and a carcass comprising a plurality of circumferentially related series of superimposed bands, the extremities of the bands seating within the grooves in the rim, means for holding said extremities of the bands within the grooves, a cushioning agency interposed between the rim and the tread portion of each series of bands, and superimposed resilient annular members arranged within the carcass and disposed circumferentially thereof and coacting with the tread portion of each series of bands.

2. A tire structure comprising, in combination, a rim provided therearound with grooves in its side faces and a carcass comprising a plurality of circumferentially related series of superimposed bands, the extremities of the bands seating within the grooves in the rim, means for holding said extremities of the bands within the grooves, a cushioning agency interposed between the rim and the tread portion of each series of bands, superimposed resilient annular members arranged within the carcass and disposed circumferentially thereof and coacting with the tread portion of each series of bands, and means for securing each series of bands to the circumferentially disposed members.

3. A tire structure comprising, in combination, a rim provided therearound with grooves in its side faces and a carcass comprising a plurality of circumferentially related series of superimposed bands, the extremities of the bands seating within the grooves in the rim, means for holding said extremities of the bands within the grooves, a cushioning agency interposed between the rim and the tread portion of each series of bands, superimposed resilient annular members arranged within the carcass and disposed circumferentially thereof and coacting with the tread portion of each series of bands, and means for securing each series of bands to the circumferentially disposed members, said annular members being transversely corrugated.

4. A tire structure comprising, in combination, a rim and a carcass comprising a series of circumferentially related series of superimposed bands, means for securing the extremities of the bands to the rim, a cushioning agency interposed between the rim and the tread portion of each series of bands, and a resilient annular member arranged within the carcass and disposed circumferentially thereof and coacting with the tread portion of each series of bands.

5. A tire structure comprising, in combination, a rim and a carcass comprising a plurality of circumferentially related series of superimposed bands, means for securing the extremities of the bands to the rim and a resilient annular member arranged within the carcass and disposed circumferentially thereof and coacting with the tread portion of each series of bands, said annular member being transversely corrugated.

6. A tire structure comprising, in combination, a rim, and a carcass comprising a plurality of circumferentially related bands, means for securing the extremities of said bands to the rim, a cushioning agency interposed between the rim and the tread portions of each series of bands, and a resilient annular member arranged within the carcass and disposed circumferentially thereof and coacting with the tread portions of the bands.

In testimony whereof I hereunto affix my signature.

ANDREW D. ROZEBOOM.